(12) United States Patent
Spiess et al.

(10) Patent No.: US 11,045,908 B2
(45) Date of Patent: Jun. 29, 2021

(54) PIERCING WORKPIECES BY A LASER BEAM AND AN ASSOCIATED LASER PROCESSING MACHINE

(71) Applicant: TRUMPF Werkzeugmaschinen GmbH + Co. KG, Ditzingen (DE)

(72) Inventors: Martin Spiess, Gerlingen (DE); Dieter Hallasch, Ditzingen (DE); Daniel Knorreck, Stuttgart (DE); Markus Blaschka, Schoenaich (DE)

(73) Assignee: TRUMPF Werkzeugmaschinen GmbH + Co. KG, Ditzingen (DE)

(*) Notice: Subject to any disclaimer, the term of this patent is extended or adjusted under 35 U.S.C. 154(b) by 844 days.

(21) Appl. No.: 15/441,560

(22) Filed: Feb. 24, 2017

(65) Prior Publication Data

US 2017/0157711 A1 Jun. 8, 2017

Related U.S. Application Data

(63) Continuation of application No. PCT/EP2015/068600, filed on Aug. 12, 2015.

(30) Foreign Application Priority Data

Aug. 28, 2014 (DE) .................. 102014217154.7

(51) Int. Cl.
*B23K 26/382* (2014.01)
*B23K 26/03* (2006.01)
(Continued)

(52) U.S. Cl.
CPC .......... *B23K 26/382* (2015.10); *B23K 26/03* (2013.01); *B23K 26/048* (2013.01);
(Continued)

(58) Field of Classification Search
CPC .... B23K 26/382; B23K 26/03; B23K 26/048; B23K 26/0884; B23K 26/10; B23K 26/38
(Continued)

(56) References Cited

U.S. PATENT DOCUMENTS 6,831,270 B2    12/2004   Furuta et al.
8,982,339 B2    3/2015   Schoenleber
(Continued)

FOREIGN PATENT DOCUMENTS

CN   102892547   1/2013
DE   102011079083   1/2013
(Continued)

OTHER PUBLICATIONS

Machine translation of JP 05-123885 performed on Oct. 21, 2019.*
(Continued)

*Primary Examiner* — Tu B Hoang
*Assistant Examiner* — Alba T Rosario-Aponte
(74) *Attorney, Agent, or Firm* — Fish & Richardson P.C.

(57) ABSTRACT

This disclosure relates to methods and apparatuses for piercing workpieces at a piercing point using a laser beam, which exits from a laser processing nozzle with a process gas, whereby a bulge is formed on the workpiece surface around the piercing point during the piercing. A distance between the laser processing nozzle and the bulge is determined during the piercing and at least one piercing parameter is changed in dependence on the distance determined.

7 Claims, 3 Drawing Sheets

(51) Int. Cl.
  *B23K 26/04* (2014.01)
  *B23K 26/08* (2014.01)
  *B23K 26/10* (2006.01)
  *B23K 26/38* (2014.01)
  *B23K 103/04* (2006.01)

(52) U.S. Cl.
  CPC .......... *B23K 26/0884* (2013.01); *B23K 26/10* (2013.01); *B23K 26/38* (2013.01); *B23K 2103/04* (2018.08)

(58) Field of Classification Search
  USPC ............... 219/121.67, 121.7, 121.71, 121.72
  See application file for complete search history.

(56) References Cited

U.S. PATENT DOCUMENTS

| | | | |
|---|---|---|---|
| 9,579,749 B2 | 2/2017 | Hammann | |
| 2003/0192865 A1* | 10/2003 | Cole, III | B23K 26/04 219/121.67 |
| 2005/0178749 A1* | 8/2005 | Yamazaki | B23K 26/03 219/121.62 |
| 2016/0096239 A1 | 4/2016 | Raichle | |

FOREIGN PATENT DOCUMENTS

| | | |
|---|---|---|
| DE | 102013210857 B3 | 8/2014 |
| DE | 102013210845 A1 | 12/2014 |
| JP | 01218780 A * | 8/1989 |
| JP | H0452094 | 2/1990 |
| JP | 03000490 Y2 | 1/1991 |
| JP | 05123885 A * | 5/1993 |
| JP | H0952187 A | 2/1997 |
| JP | 3115060 B2 | 9/2000 |
| JP | 3131357 B2 | 11/2000 |
| JP | 2001321975 | 11/2001 |
| JP | 2009190064 A | 8/2008 |
| WO | WO2013007674 A1 | 1/2013 |

OTHER PUBLICATIONS

Machine translation of JP 01-218780 performed on Oct. 18, 2019.*
International Search Report for corresponding PCT Application No. PCT/EP2015/068600, dated Nov. 24, 2015, 4 pages.

* cited by examiner

PIERCING WORKPIECES BY A LASER BEAM AND AN ASSOCIATED LASER PROCESSING MACHINE

CROSS-REFERENCE TO RELATED APPLICATIONS

This application is a continuation of and claims priority under 35 U.S.C. § 120 to PCT Application No. PCT/EP2015/068600 filed on Aug. 12, 2015, which claims priority to German Application No. DE 10 2014 217 154.7, filed on Aug. 28, 2014. The entire contents of these priority applications are incorporated herein by reference.

TECHNICAL FIELD

The present invention relates to methods and apparatuses for piercing a workpiece at a piercing point by a laser beam and a process gas.

BACKGROUND

When piercing workpieces by means of a laser beam, in particular when using oxygen as the process gas, the distance of the laser processing nozzle from the workpiece must be set such that the process gas is introduced optimally into the process point. When piercing thick sheets (sheet thickness ≥5 mm), bulges of molten and re-solidified metal or metal oxide occur in the vicinity of the piercing hole, increasing significantly in size with increasing sheet thickness. A particular characteristic here is that there is a columnar accretion of the bulge (also referred to as a cone) around the piercing point. This has the consequence that the introduction of the process gas changes with the accretion of the bulge, and as a result the piercing process cannot be performed optimally. In practice therefore, when piercing thick sheets, a constant piercing distance of the laser processing nozzle from the sheet is set, chosen so as to obtain the best possible compromise between "still tolerated bulge growth" and "still good process gas introduction." This constant piercing distance must always be chosen to be great enough that the bulge does not grow up to the laser processing nozzle and cause damage there.

International patent publication WO 2013/007674 A1 discloses a cutting method in which the surface topography of the workpiece is determined during the cutting operation from the signals of the distance control.

Japanese patent publications JP 03000490 A1 and JPH 04052094 A disclose switching off the distance control during piercing and switching it on again during the subsequent cutting only after the laser processing head has moved a certain distance. During the piercing, the laser processing head together with its laser processing nozzle is positioned constantly at a greater distance from the workpiece than during the subsequent cutting.

German patent publication DE 10 2013 210 845.1 discloses a method for piercing a metal workpiece by means of a laser beam and a process gas in which, in a first step, a piercing hole is punched through the workpiece by means of the laser beam and the process gas. In a second step, a bulge formed on the workpiece surface around the piercing hole in the first step is melted by means of the laser beam then set to a greater focus diameter and is thereby reshaped as much as possible into a flatter form or is at least partially removed.

SUMMARY

Various embodiments disclosed herein provide methods and apparatuses that prevent a laser processing nozzle from being damaged by an accreting bulge formed on a workpiece surface around a laser piercing point in the workpiece.

In one aspect, the disclosure provides methods for piercing a workpiece (e.g., a metal workpiece) with a laser processing machine. The methods include piercing the workpiece at a piercing point using a laser beam emitted from the laser processing machine. The laser beam and a process gas both exit from a laser processing nozzle of the laser processing machine. A bulge is formed on the workpiece surface around the piercing point during the piercing. A distance between the laser processing nozzle and the bulge is determined continuously during piercing or intermittently (e.g. repeatedly and contemporaneously) with the piercing, for example by measuring the distance between the laser processing nozzle and the bulge. At least one piercing parameter of the laser processing machine is changed in dependence on the distance determined. Accordingly, by changing the distance between the laser machine nozzle and the workpiece surface based on the distance determined, the distance between the laser processing nozzle and the bulge can be controlled to a predetermined setpoint distance. In certain implementations, the accretion of a bulge at the piercing point is detected with the aid of a distance sensor system, and then one or more piercing parameters is/are changed in dependence on the distance measured. The measuring of the distance between the laser processing nozzle and the bulge (e.g., the upper side of the bulge) can be performed, for example, by a capacitive distance sensor system. The capacitive distance sensor can be arranged on the processing head of the laser processing machine. In particular implementations, the distance may also be measured inductively or optically, i.e., by way of a light section sensor system or with the aid of a camera.

In some implementations, the changed piercing parameter is a vertical position (z position) of the laser processing nozzle in the laser processing machine or the distance of the laser processing nozzle from the actual workpiece surface. With the accretion of the bulge, the distance of the laser processing nozzle from the workpiece surface increases and, as a result, the distance of the laser processing nozzle from the bulge is controlled to a predetermined (for example constant) setpoint distance. The position of the laser processing nozzle (or of the laser processing head) is therefore readjusted so as to correspond to the height of the bulge in the direction of the z axis. By the readjustment, the process is performed optimally in dependence on the bulge and the necessary process time is largely optimized.

The evaluation of the distance data of the distance sensor system makes it possible during the piercing to draw conclusions about the accretion and the height of the bulge. With this information, it is then possible to provide control data that sets an optimum distance of the laser processing nozzle in relation to the bulge (i.e., in relation to the upper side of the bulge) continuously or step by step during the course of the process. The control of the distance of the laser processing nozzle from the bulge to a predetermined setpoint distance (e.g., a constant distance) advantageously improves the introduction of the process gas into the piercing point, for example, in comparison to systems where the distance of the laser processing nozzle from the workpiece surface is set as a fixed distance. The setpoint distance of the laser processing nozzle from the bulge may have a constant value. Alternatively, the setpoint distance may change in the course of the process. Thus, the distance of the laser processing nozzle from the upper side of the bulge may, for example, be smaller toward the end of the piercing process, to prevent exceeding a limit value for the distance between the laser processing nozzle and the workpiece surface.

In particular implementations, during the piercing at least one of the following piercing parameters is changed—once, continuously, or step by step—in dependence on the distance measured: distance of the laser processing nozzle from the workpiece surface, distance of the laser processing nozzle from the bulge, focus position of the laser beam with respect to the workpiece, focus diameter of the laser beam, power of the laser beam, gas pressure of the process gas exiting from the laser processing nozzle and type of gas of the process gas exiting from the laser processing nozzle. With the distance sensor system, the distance of the laser processing nozzle from the bulge (or from the upper side of the bulge) is measured, but the reaction to it may not only take the form of changing the distance, but may also (additionally or alternatively) be based on other manipulated variables (focus position, focus diameter, power, pulse frequency, gas pressure, type of gas (for example change from initially oxygen to nitrogen), or other variables).

In certain implementations, during the piercing, the distance of the laser processing nozzle from the actual workpiece surface and/or the height of the bulge are determined from the distance the laser processing nozzle moves perpendicular to the workpiece surface instead of from the sensor signal of the distance control device. In dependence on the determined distance of the laser processing nozzle from the workpiece surface or on the determined height of the bulge, at least one of the aforementioned further manipulated variables can then advantageously be changed—once, continuously or step by step—during the piercing.

With increasing distance of the laser processing nozzle from the actual workpiece surface, for example:
- the focus position can be displaced downward, to keep the focus position in relation to the workpiece surface constant or change it as desired;
- the focus diameter can be changed, to keep the focus diameter on the workpiece constant or change it as desired;
- the gas pressure can be increased, to keep the gas pressure on the workpiece constant or change it as desired;
- the power of the laser beam can be increased, to keep the power on the workpiece constant or change it as desired; and/or
- the process gas can be changed, for example from initially oxygen to an inert gas.

The methods according to certain embodiments of the invention may be implemented both on a solid-state laser cutting machine and on a laser cutting machine with a $CO_2$ laser and are particularly advantageous when piercing thick sheets with a sheet thickness of at least 10 mm.

In another aspect, the invention also relates to laser processing machines including a laser beam generator for generating a laser beam, a movable laser processing head with a laser processing nozzle, from which the laser beam exits together with a process gas, a distance sensor system arranged on the laser processing head for measuring the distance of the laser processing nozzle from a workpiece, a machine controller for moving the laser processing head, and a control device. The control device is programmed to change during the piercing of a workpiece by means of the laser beam at least one piercing parameter in dependence on the measured distance between the laser processing nozzle and a bulge that is formed on the workpiece surface around a piercing point during the piercing. For example, the control device can control the distance of the laser processing nozzle from the bulge to a predetermined setpoint distance by changing the vertical position of the laser processing head in the laser processing machine.

Another aspect of the invention relates to computer program products, such as a computer-readable storage device storing computer executable instructions, for causing piercing of a workpiece with a laser processing machine. The computer executable instructions are configured such that if they are executed by a machine controller of the laser processing machine, they will cause the laser processing machine to carry out all of the steps of the piercing methods according to one or more embodiments or implementations of the invention disclosed herein.

Further advantages and advantageous refinements of the subject matter of the invention can be taken from the description, the drawing and the claims. Similarly, the features mentioned above and features still to be set out can each be used on their own or together in any desired combinations. The embodiments shown and described should not be understood as an exhaustive list, but rather as being of an exemplary character for the description of the invention.

DETAILED DESCRIPTION

Figure 1:
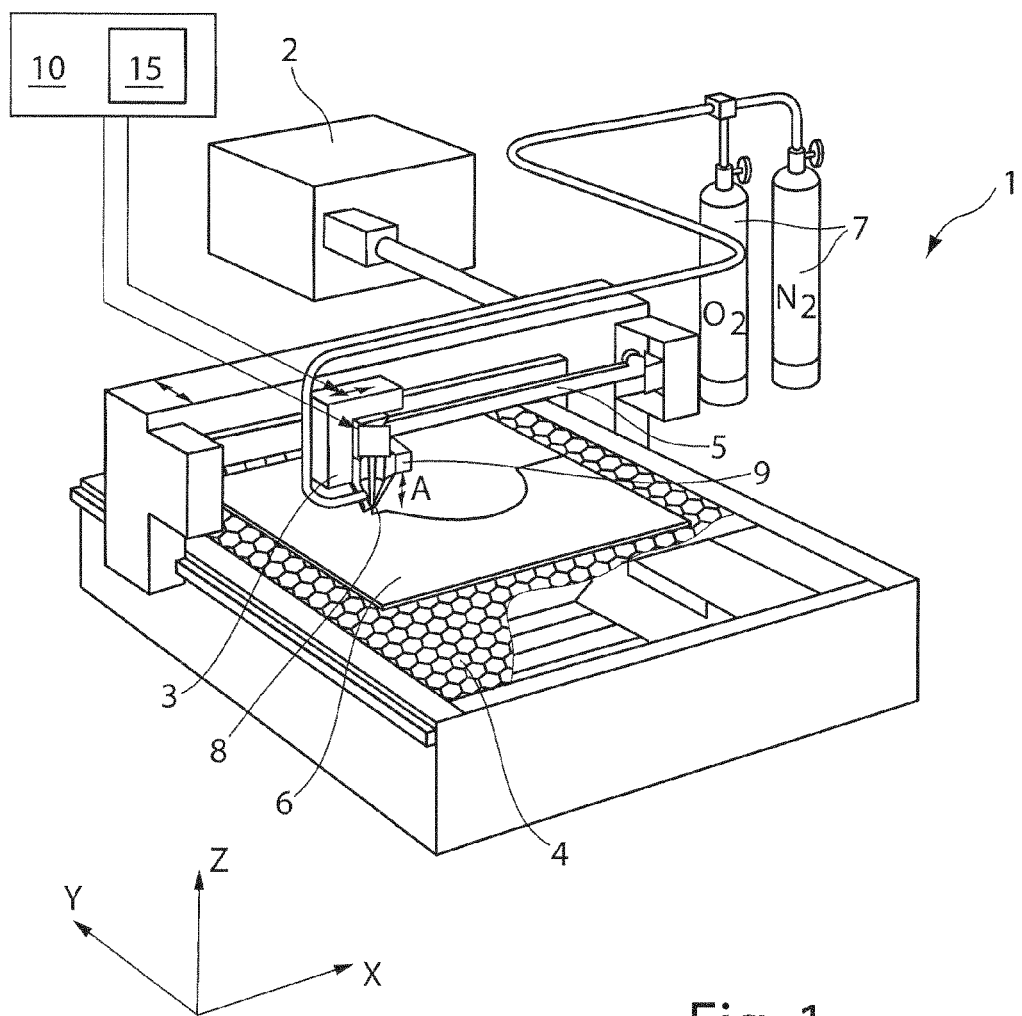
FIG. 1 shows a laser cutting machine for carrying out the piercing methods according particular embodiments of the invention.

In FIG. 1, a laser processing machine 1 configured as a laser cutting machine is shown in a perspective view. Further laser processing machines can include a laser welding machine or a combined punching/laser cutting machine. The laser processing machine 1 comprises, for example, a $CO_2$ laser, a diode laser, or a solid-state laser as a laser beam generator 2, a laser processing head 3 that can move in the X, Y and Z directions and a workpiece support 4. A laser beam 5 is generated in the laser beam generator 2. The laser beam 5 is guided from the laser beam generator 2 to the laser processing head 3 by a fiber-optic cable (not shown) or deflecting mirrors (not shown). The laser beam 5 is directed by a focusing optical system arranged in the laser processing head 3 onto a workpiece 6, which is arranged on the workpiece support 4. The laser processing machine 1 is additionally provided with process gases 7, for example oxygen and nitrogen. Compressed air or application-specific gases may alternatively or additionally also be provided. The use of the individual gases is dependent on the material of the workpiece 6 to be machined and on quality requirements for the cut edges. The process gas 7 is fed to a laser processing nozzle 8 of the laser processing head 3, from which the gas 7 exits together along with the laser beam 5.

The laser processing head 3 includes a distance sensor system 9 for obtaining a measurement of a distance, A, between the laser processing nozzle 8 and the workpiece 6. The distance sensor system 9 can be integrated in the laser processing head. The distance sensor system 9 includes a capacitive sensor system in certain embodiments. The distance sensor system 9 can include an inductive or optical sensor system in certain embodiments.

The laser processing machine 1 also comprises a machine controller 10 for moving the laser processing head 3 together with the laser processing nozzle 8 in the X, Y and Z directions. The machine controller 10 is communicably coupled to one or more actuators configured to move the laser processing head 3 with respect to the workpiece support 4.

In FIGS. 2A to 2D, a time progression during the piercing of the workpiece 6 by the laser beam 5 is shown. The workpiece 6 may be a sheet of steel with a sheet thickness of at least 10 mm.

Figure 2A:
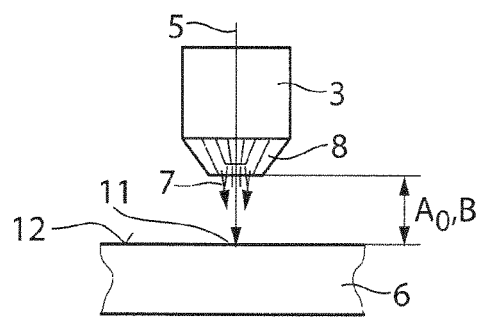
FIGS. 2A, 2B, 2C and 2D show the progression over time during the piercing methods according to certain embodiments of the invention.

FIG. 2A shows the beginning (time to) of the piercing operation, in which the laser beam 5 is transmitted to pierce the workpiece 6 at a piercing point 11 by means of a pulsed or continuous transmission of the laser beam 5 and with oxygen as the process gas 7. The initial nozzle distance $A_0$ of the laser processing nozzle 8 from the workpiece surface 12 corresponds to a setpoint distance B predetermined as a fixed distance of for example 5 mm.

Figure 2B:
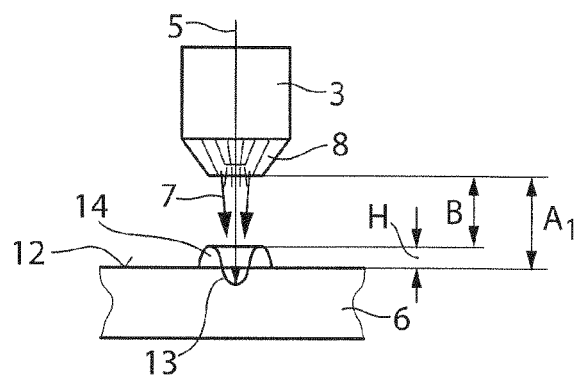

In FIG. 2B, a piercing hole 13, the depth of which is approximately ⅓ of the workpiece thickness, has been pierced into the workpiece surface 12 at the time $t_1$ by the laser beam 5 and the process gas 7. The material of the workpiece that is melted during the piercing is formed around the piercing hole 13 and forms a bulge 14 on the upper side 12 of the workpiece 6. During the piercing, the distance between the laser processing nozzle 8 (e.g. a distal end of the laser processing nozzle) and the bulge 14 (e.g., an apex of the bulge) is measured continuously with the distance sensor system 9, and a control device 15 maintains the distance between the laser processing nozzle 8 and the bulge 14 at the setpoint distance B. For example, the height of the workpiece can be adjusted by adjusting a height of the workpiece support 4 via the control device 15, which can be integrated in the machine controller 10. The distance between the laser processing nozzle 8 and the workpiece 6, i.e. the plan upper side 12 or the formed bulge 14, can be adjusted by moving the workpiece support 4 in a direction orthogonal to a plane of the workpiece surface 12. The nozzle distance $A_1$ of the laser processing nozzle 8 from the actual workpiece surface 12 is changed by the vertically growing bulge 14 and is greater by the height H of the bulge 14 than the initial nozzle distance $A_0$ ($A_1 > A_0$). With the changing of the nozzle distance A, it may also be appropriate, depending on the piercing process, to adapt the focus position of the laser beam 5, with respect to the workpiece surface 12, by way of the machine controller 10 or the control device 15. In particular, the focus position may be displaced downward, to keep a focus position constant in relation to the workpiece 6.

Figure 2C:
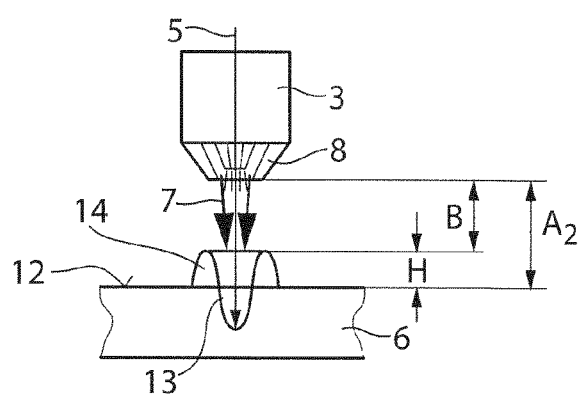

In FIG. 2C, the depth of the piercing hole 13 at the time $t_2$ is approximately ⅔ of the workpiece thickness. The height H of the bulge 14 has correspondingly increased further and the distance of the laser processing nozzle 8 from the bulge 14 has been controlled to the setpoint distance B. The further vertically grown bulge 14 also has the effect that the nozzle distance $A_2$ of the laser processing nozzle 8 from the actual workpiece surface 12 has increased and is greater by the height H of the bulge 14 than the initial nozzle distance $A_0$ ($A_2 > A_1 > A_0$).

Figure 2D:
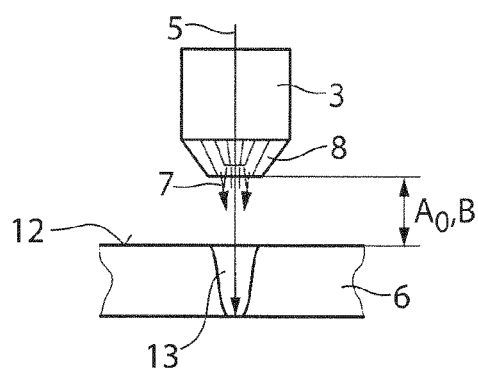

FIG. 2D shows the time t3, at which the piercing hole 13 has been pierced and the piercing operation has been completed. If, as represented in FIG. 2D, the bulge 14 has already come away from the upper side 12 of the workpiece, the laser processing nozzle 8 is reset to the initial distance $A_0$ from the workpiece surface 12.

As an alternative or in addition to controlling a piercing parameter such as the distance of the laser processing nozzle 8 from the bulge 14, other piercing parameters such as the focus position, or other piercing parameters may also be changed in dependence on the nozzle distance A or on the height H of the bulge 14. For example:

the focus diameter can be adjusted, to keep the focus diameter on the workpiece 6 constant;

the gas pressure of the process gas 7 can be adjusted, to keep the gas pressure on the workpiece 6 constant (in FIGS. 2A to 2C, a rise in the gas pressure is schematically indicated by flow arrows of differing thickness);

the power of the laser beam 5 can be adjusted, to keep the power on the workpiece 6 constant; and/or the type of gas of the process gas 7 can be changed, for example from initially oxygen to an inert gas.

For this, during the piercing, the nozzle distance A and/or the height H of the bulge 14 is/are determined from the distance the laser processing nozzle 8 moves perpendicular to the workpiece surface 12.

Figure 3:
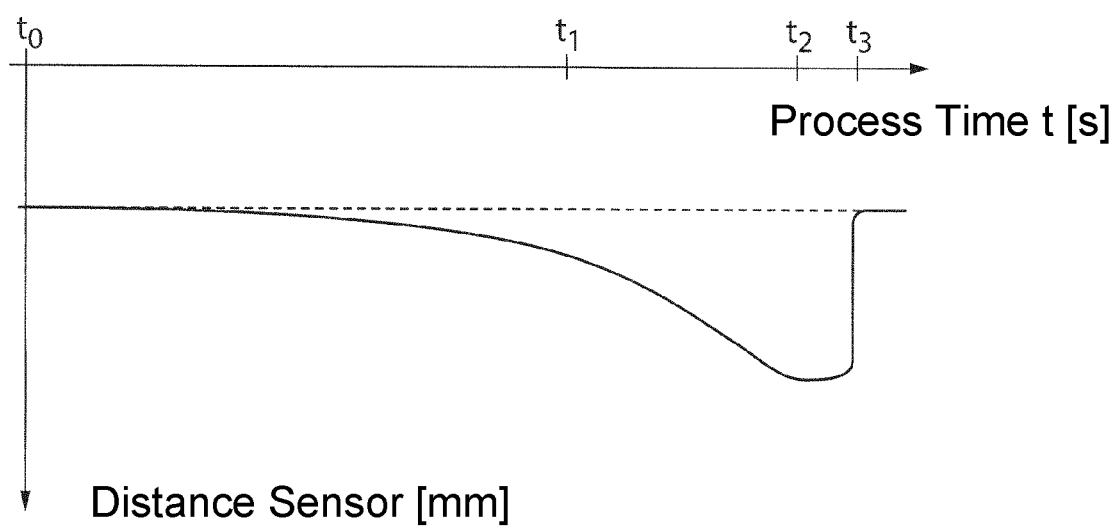
FIG. 3 shows the variation over time of the changing determined value of a distance between a fixed laser processing head and a bulge formed a piercing operation.

FIG. 3 shows the (filtered) variation over time of the changing measured value determined via the distance sensor system 9 during the piercing operation with a fixed laser processing head 3. The measured value changes on account of the accreting bulge 14, i.e. on account of the reduction in the distance between the upper side of the bulge and the lower side of laser processing nozzle 8. The measured variation of the sensor signal may be converted into a variation of the actual distance between the laser processing nozzle 8 and the bulge 14, for example with the aid of conversion characteristics that are empirically determined in advance in test measurements and stored in the control device 15. The data thus determined serves as a basis for controlling the distance between the laser processing nozzle 8 and the bulge 14.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A method for piercing a workpiece with a laser processing machine, the method comprising:

piercing the workpiece at a piercing point with a laser beam emitted from the laser processing machine, wherein the laser beam and a process gas exit from a laser processing nozzle of the laser processing machine, whereby a bulge is formed on a surface of the workpiece around the piercing point during the piercing;

determining a distance between the laser processing nozzle and the bulge during the piercing of the workpiece; controlling the distance between the laser processing nozzle and the bulge to be a predetermined setpoint distance (B) by changing a distance (A) between the laser machine nozzle and the surface of the workpiece; and changing at least one piercing parameter of the laser processing machine in response to a change in the distance between the laser processing nozzle and the bulge determined during the piercing of the workpiece.

2. The method of claim 1, wherein the distance between the laser processing nozzle and the bulge is determined by measuring the distance between the laser processing nozzle and the bulge.

3. The method of claim 1, wherein changing at least one piercing parameter comprises changing at least one of the following piercing parameters in dependence on the distance determined:
- the distance (A) between the laser processing nozzle and the surface of workpiece,
- the distance of the laser processing nozzle from the bulge,
- a focus position of the laser beam with respect to the workpiece,
- a focus diameter of the laser beam,
- a power of the laser beam,
- a gas pressure of the process gas exiting from the laser processing nozzle, and
- a type of gas of the process gas exiting from the laser processing nozzle.

4. The method of claim 1, wherein the predetermined setpoint distance (B) is constant or changing during the piercing.

5. The method of claim 4, wherein the predetermined setpoint distance (B) decreases during the piercing.

6. The method of claim 1, wherein during the piercing, at least one of the distance (A) between the laser processing nozzle and the surface of the workpiece and a height (H) of the bulge are determined from a distance that the laser processing nozzle moves perpendicular to the workpiece surface.

7. The method of claim 6, wherein during the piercing at least one piercing parameter selected from the group consisting of:
- a focus position of the laser beam with respect to the workpiece,
- a focus diameter of the laser beam,
- a power of the laser beam,
- a gas pressure of the process gas exiting from the laser processing nozzle, and
- a type of gas of the process gas exiting from the laser processing nozzle,
- is changed in dependence on at least one of the distance (A) between the laser processing nozzle and the surface of the workpiece and the height (H) of the bulge.

* * * * *